(12) United States Patent
Ito et al.

(10) Patent No.: US 10,071,362 B2
(45) Date of Patent: Sep. 11, 2018

(54) WATER ABSORBING MATERIAL AND MANUFACTURING METHOD THEREOF

(71) Applicant: DAIKI CO., LTD., Tokyo (JP)

(72) Inventors: Hiroshi Ito, Tokyo (JP); Junji Yoshinaga, Tokyo (JP)

(73) Assignee: DAIKI CO., LTD., Tokyo (JP)

( * ) Notice: Subject to any disclaimer, the term of this patent is extended or adjusted under 35 U.S.C. 154(b) by 315 days.

(21) Appl. No.: 14/833,584

(22) Filed: Aug. 24, 2015

(65) Prior Publication Data
US 2015/0360202 A1 Dec. 17, 2015

Related U.S. Application Data

(63) Continuation of application No. PCT/JP2013/060521, filed on Apr. 5, 2013.

(51) Int. Cl.
| | | |
|---|---|---|
| B01J 20/24 | (2006.01) |
| A01K 1/015 | (2006.01) |
| B01J 20/26 | (2006.01) |
| B01J 20/30 | (2006.01) |
| B07B 1/22 | (2006.01) |
| B09B 5/00 | (2006.01) |
| B09B 3/00 | (2006.01) |
| B01J 20/28 | (2006.01) |
| B01J 20/32 | (2006.01) |

(52) U.S. Cl.
CPC ............... *B01J 20/24* (2013.01); *A01K 1/015* (2013.01); *A01K 1/0154* (2013.01); *A01K 1/0155* (2013.01); *B01J 20/26* (2013.01); *B01J 20/28016* (2013.01); *B01J 20/30* (2013.01); *B01J 20/3021* (2013.01); *B01J 20/3028* (2013.01); *B01J 20/3078* (2013.01); *B01J 20/3236* (2013.01); *B01J 20/3293* (2013.01); *B07B 1/22* (2013.01); *B09B 3/00* (2013.01); *B09B 5/00* (2013.01)

(58) Field of Classification Search
CPC .................................. B01J 20/24; B01J 20/26
See application file for complete search history.

(56) References Cited

FOREIGN PATENT DOCUMENTS

| | | |
|---|---|---|
| JP | 3768203 B2 | 4/2006 |
| JP | 2006-167588 A | 6/2006 |
| JP | 2006-333773 A | 12/2006 |

OTHER PUBLICATIONS

Jul. 16, 2013 International Search Report issued in International Patent Application No. PCT/JP2013/060521.
Jul. 16, 2013 Written Opinion issued in International Patent Application No. PCT/JP2013/060521.

*Primary Examiner* — Peter F Godenschwager
(74) *Attorney, Agent, or Firm* — Oliff PLC

(57) ABSTRACT

A water absorbing material contains paper powder obtained by separating gypsum from a gypsum board as its raw material. The weight ratio of the gypsum adhering to the paper powder with respect to the paper powder is 5% or less.

13 Claims, 12 Drawing Sheets

WATER ABSORBING MATERIAL AND MANUFACTURING METHOD THEREOF

CROSS REFERENCE TO RELATED APPLICATION

This is a Continuation of International Application No. PCT/JP2013/060521 filed Apr. 5, 2013. The contents of this application are hereby incorporated by reference in their entirety.

TECHNICAL FIELD

The present invention relates to a water absorbing material that absorbs liquid such as excrement of humans or animals, and a manufacturing method of the water absorbing material.

BACKGROUND ART

Patent Document 1 describes an excrement treatment material for animals that is a type of water absorbing material. The excrement treatment material employs paper pieces obtained by crushing a waste gypsum board as a raw material, and is made of cotton-like dissociated matter which is obtained by pulverizing the paper pieces and which is compression-granulated into a granular shape.

Patent Document 1: Japanese Patent No. 3768203

SUMMARY OF INVENTION

Technical Problem

Employing the paper pieces derived from the waste gypsum board as a raw material contributes to reduction of procuring cost of raw materials and eventually reduction of manufacturing cost of the excrement treatment material. However, the paper pieces employed in the excrement treatment material of Patent Document 1 are obtained only by crushing the waste gypsum board, and therefore a large amount of gypsum remains on the paper pieces as impurities. The presence of a lot of impurities causes deterioration in quality of the excrement treatment material, for example, degradation of water absorbing performance.

Solution to Problem

The present invention was made in view of the above-described problems, and it is an object thereof to provide a water absorbing material which can be manufactured at low cost without causing deterioration in quality, and a manufacturing method of the water absorbing material.

A water absorbing material according to the present invention contains paper powder obtained by separating gypsum from a gypsum board as a raw material, wherein a weight ratio of the gypsum adhering to the paper powder with respect to the paper powder is 5% or less.

In this water absorbing material, paper powder obtained by separating gypsum from a gypsum board is employed as a raw material. Thus, the paper powder can be obtained from a waste gypsum board, and therefore it is possible to reduce procuring cost of raw materials and eventually reduce manufacturing cost of the water absorbing material. Moreover, because the weight ratio of the gypsum remaining on the paper powder is only 5% or less, it is possible to prevent deterioration in quality of the water absorbing material.

A manufacturing method of a water absorbing material according to the present invention includes an obtaining step of separating gypsum from a gypsum board to obtain paper powder, and a granulating step of granulating a raw material containing the paper powder obtained in the obtaining step, wherein in the obtaining step, the gypsum is separated from the gypsum board so that a weight ratio of the gypsum adhering to the paper powder with respect to the paper powder will be 5% or less.

In this manufacturing method, paper powder obtained by separating gypsum from a gypsum board is employed as a raw material. Thus, the paper powder can be obtained from a waste gypsum board, and therefore it is possible to reduce procuring cost of raw materials and eventually reduce manufacturing cost of the water absorbing material. Moreover, because the weight ratio of the gypsum remaining on the paper powder is only 5% or less, it is possible to prevent deterioration in quality of the water absorbing material.

Advantageous Effects of Invention

According to the present invention, a water absorbing material which can be manufactured at low cost without causing deterioration in quality, and a manufacturing method of the water absorbing material are realized.

DESCRIPTION OF EMBODIMENTS

Figure 1:
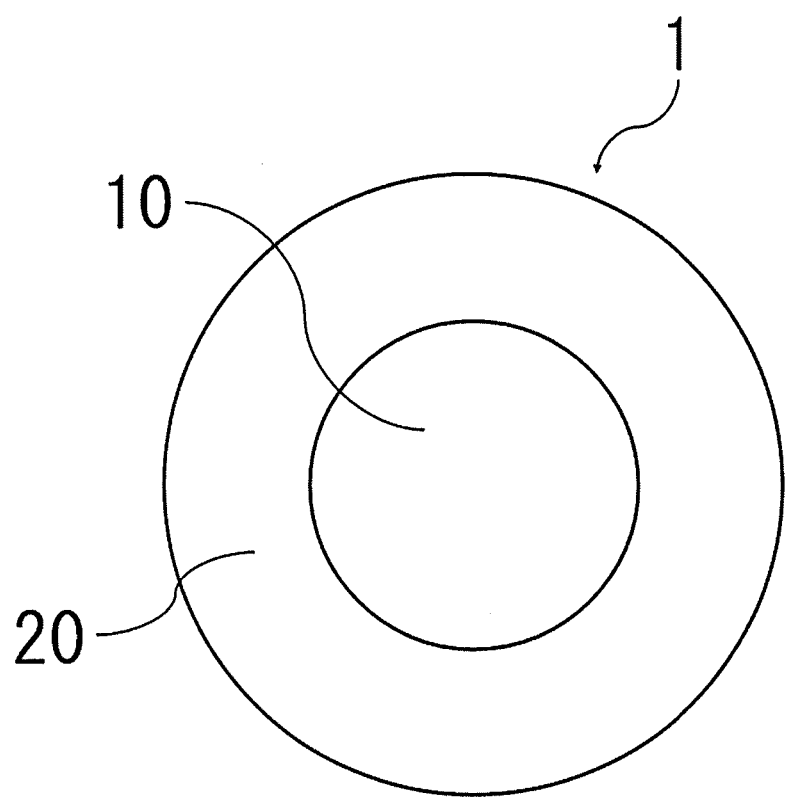
FIG. 1 is a schematic view of an embodiment of a water absorbing material according to the present invention.

Hereinafter, embodiments of the present invention will be described in detail with reference to the drawings. It should be noted that the description of the drawings denotes like elements by like reference numerals and omits redundant descriptions.

FIG. 1 is a schematic view of an embodiment of a water absorbing material according to the present invention. A water absorbing material 1 is an excrement treatment material for a pet animal such as cat and dog, and includes a granular core portion 10 and a coating layer portion 20. The granular core portion 10 contains paper powder obtained by separating gypsum from a gypsum board as its raw material. Such separation is performed by a separation device mentioned later.

A small amount of gypsum adheres to the paper powder, because it is hard to completely separate gypsum from a gypsum board. However, in the water absorbing material 1, the weight ratio of the gypsum adhering to the paper powder with respect to the paper powder is 5% or less. The weight ratio is preferably 3% or less, and more preferably 1% or less. A waste gypsum board is preferably used as the gypsum board.

In the present embodiment, the paper powder is contained in the water absorbing material 1 as a main material. Here, the main material refers to the raw material whose weight ratio with respect to the water absorbing material 1 is the highest among all raw materials constituting the water absorbing material 1. The paper powder is obtained by separating the gypsum from the gypsum board after putting the gypsum into a state of hemihydrate gypsum as described later. The grain size of the paper powder is preferably 3 mm or less.

The coating layer portion 20 covers the granular core portion 10. The coating layer portion 20 may cover the entire surface of the granular core portion 10, or may cover only a part of the surface of the granular core portion 10. The coating layer portion 20 contains fluff pulp and a water-absorbent polymer (including a highly water-absorbent polymer; the same shall apply hereinafter) that are separated from a disposable diaper as its raw materials.

Figure 2:
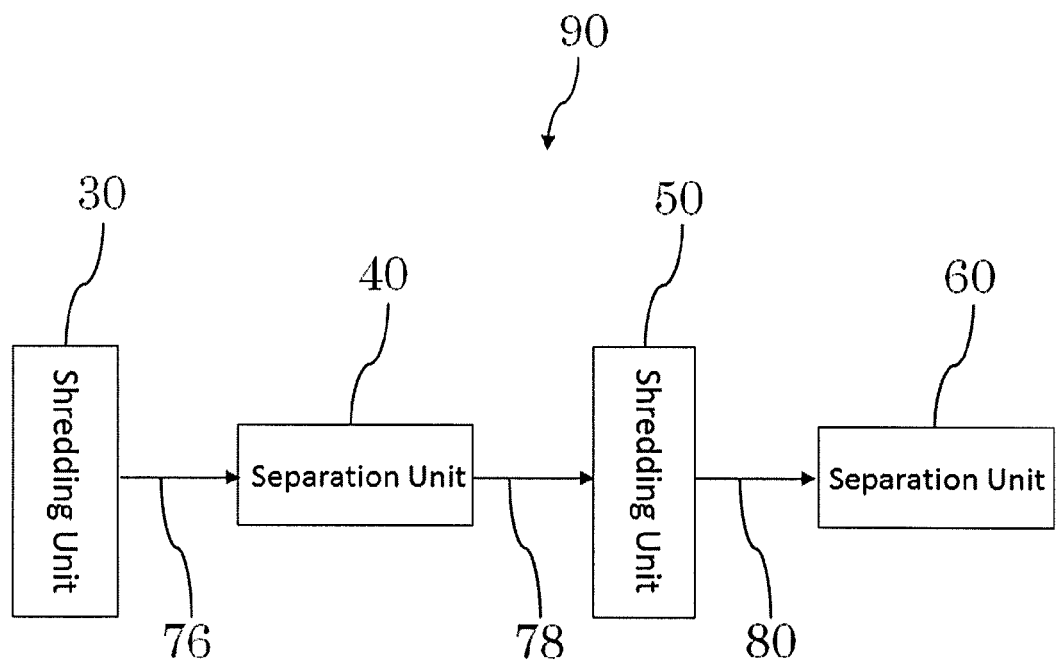
FIG. 2 is a configuration diagram showing an embodiment of a separation device according to the present invention.

FIG. 2 is a configuration diagram showing a separation device used in the present embodiment. A separation device 90 processes a processing target containing a first material and a second material adhering to the first material, thereby dissociating the second material from the first material and separating the second material from the processing target. In the present embodiment, the processing target is a gypsum board, the first material is paper, and the second material is gypsum.

The separation device 90 includes a shredding unit 30 (first shredding unit), a separation unit 40 (first separation unit), a shredding unit 50 (second shredding unit), and a separation unit 60 (second separation unit).

The shredding unit 30 shreds the gypsum board. The gypsum board to be shredded by the shredding unit 30 may be shredded to a certain degree beforehand. For example, a crusher or a grinder can be used as the shredding unit 30. A screen is provided in the shredding unit 30. The hole diameter of the screen may be between 10 mm and 30 mm inclusive, for example.

Figure 3:
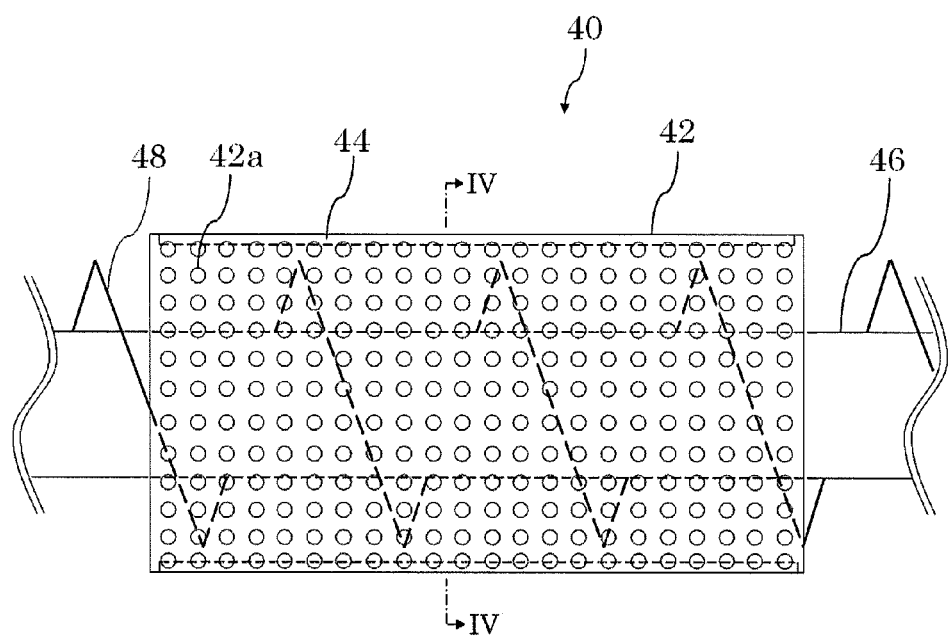
FIG. 3 is a side view showing a separation unit 40 of the separation device in FIG. 2.
Figure 4:
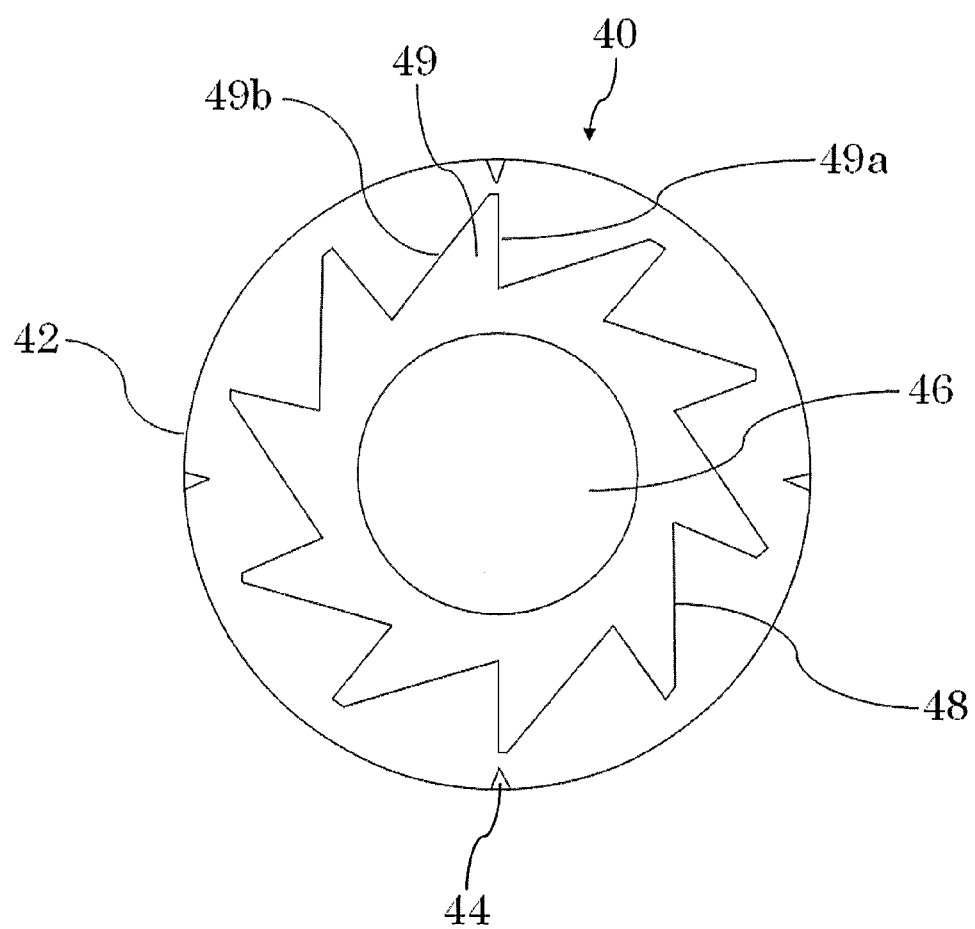
FIG. 4 is a cross-sectional view taken along line IV-IV in FIG. 3.

The structure of the separation unit 40 will be described with reference to FIGS. 3 and 4. FIG. 3 is a side view showing the separation unit 40. FIG. 4 is a cross-sectional view taken along line IV-IV in FIG. 3. The separation unit 40 has a drum 42 (first tubular portion). The drum 42 has a substantially cylindrical tubular shape and is provided so as to be rotatable about its central axis. The central axis of the drum 42 extends horizontally. The inner diameter of the drum 42 may be between 30 cm and 50 cm inclusive, for example.

A large number of holes 42a (first holes) are formed in the drum 42. The holes 42a are formed over substantially the entire drum 42. The holes 42a do not allow paper pieces contained in the gypsum board shredded by the shredding unit 30 to pass through, but allow the gypsum to pass through. The diameter of the holes 42a may be between 5 mm and 20 mm inclusive, for example. The separation unit 40 rotates the drum 42 in a state in which the gypsum board shredded by the shredding unit 30 is accommodated therein, thereby separating the gypsum passing through the holes 42a from the gypsum board.

A ridge 44 (first ridge) is formed on an inner circumferential surface of the drum 42. The ridge 44 extends in a direction in which the central axis of the drum 42 extends. The ridge 44 extends over substantially the entire path from an inlet side (left side of FIG. 3) to an outlet side (right side of FIG. 3) of the drum 42. Also, the ridge 44 has a substantially triangular cross-sectional shape. The height (length in the radial direction of the drum 42) of the ridge 44 may be between 5 mm and 2 cm inclusive, for example. Preferably, "p" (p: an integer between 3 and 5 inclusive) ridges 44 are provided. The "p" ridges 44 are arranged on the inner circumferential surface of the drum 42 at regular intervals. That is so say, in a cross section (cross section shown in FIG. 4) that is perpendicular to the central axis of the drum 42, an angle α that is formed by a line connecting one ridge 44 to the central axis and a line connecting the next ridge 44 to the central axis is substantially equal to 360°/p. In the present embodiment, p=4 and α=90°.

A rotating rod 46 and a screw member 48 are provided inside the drum 42. The rotating rod 46 has a substantially cylindrical shape and is provided so as to be rotatable about its central axis. The central axis of the rotating rod 46 coincides with the central axis of the drum 42. However, the rotating rod 46 rotates independently of the drum 42. The outer diameter of the rotating rod 46 may be between 15 cm and 25 cm inclusive, for example.

The screw member 48 is helically provided around the rotating rod 46. The screw member 48 is fixed to the rotating rod 46 and rotates together with the rotating rod 46. A plurality of teeth 49 are formed in the screw member 48. An end portion of each tooth 49 is constituted by a side 49a and a side 49b in a front view (see FIG. 4).

The side 49a extends in the radial direction of the drum 42 and the rotating rod 46. An inner end (end that is closer to the rotating rod 46) of the side 49a is located at a position spaced apart from the rotating rod 46. Similarly, an outer end (end that is closer to the drum 42) of the side 49a is located at a position spaced apart from the drum 42. The distance from the outer end of the side 49a to the inner circumferential surface of the drum 42 is larger than the height of the ridge 44 and may be between 1 cm and 3 cm inclusive, for example. The side 49b connects the outer end of the side 49a to the inner end of the side 49a of the next tooth 49. The side 49b is longer than the side 49a. The ratio of the length of the side 49b to the length of the side 49a may be between 2 and 2.5 inclusive, for example.

The rotating rod 46 and the screw member 48 rotate in a left-handed direction (counterclockwise) in FIG. 4. That is to say, in each tooth 49, the side 49b is located on the forward side with respect to the rotation direction, and the side 49a is located on the rearward side with respect to the rotation direction. The rotation direction of the drum 42 described above may be the same as the rotation direction of the rotating rod 46 and the screw member 48 or may be opposite to this rotation direction. In the case where these rotation directions are the same, it is preferable that the rotation speed of the rotating rod 46 and the screw member 48 is greater than the rotation speed of the drum 42.

The shredding unit 50 shreds the gypsum board from which the gypsum passing through the holes 42a has been separated by the separation unit 40. For example, a crusher or a grinder can be used as the shredding unit 50. A screen is provided in the shredding unit 50. The hole diameter of the screen may be between 5 mm and 20 mm inclusive, for example.

Figure 5:
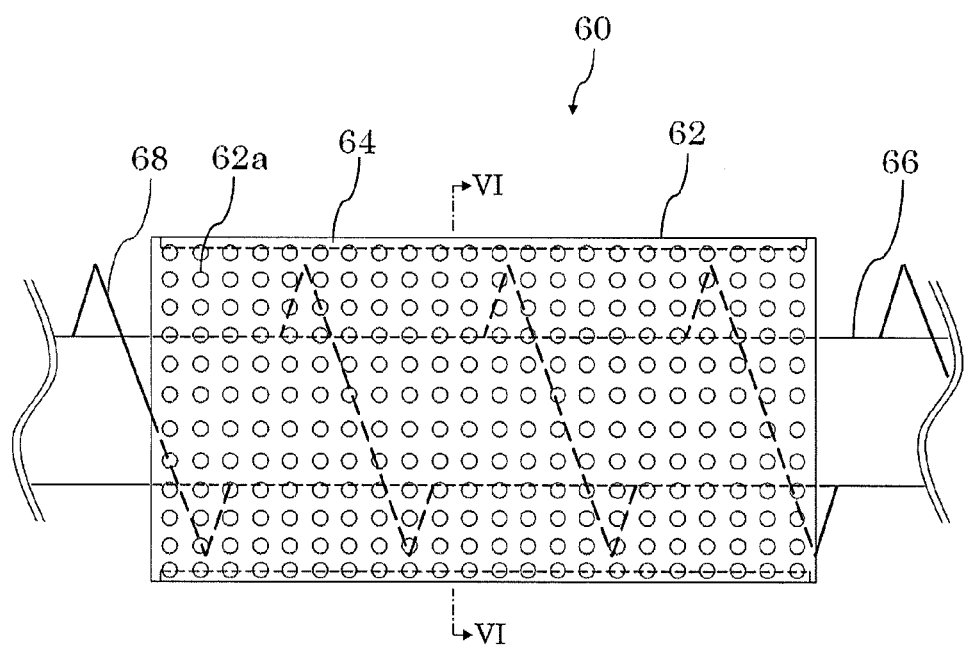
FIG. 5 is a side view showing a separation unit 60 of the separation device in FIG. 2.
Figure 6:
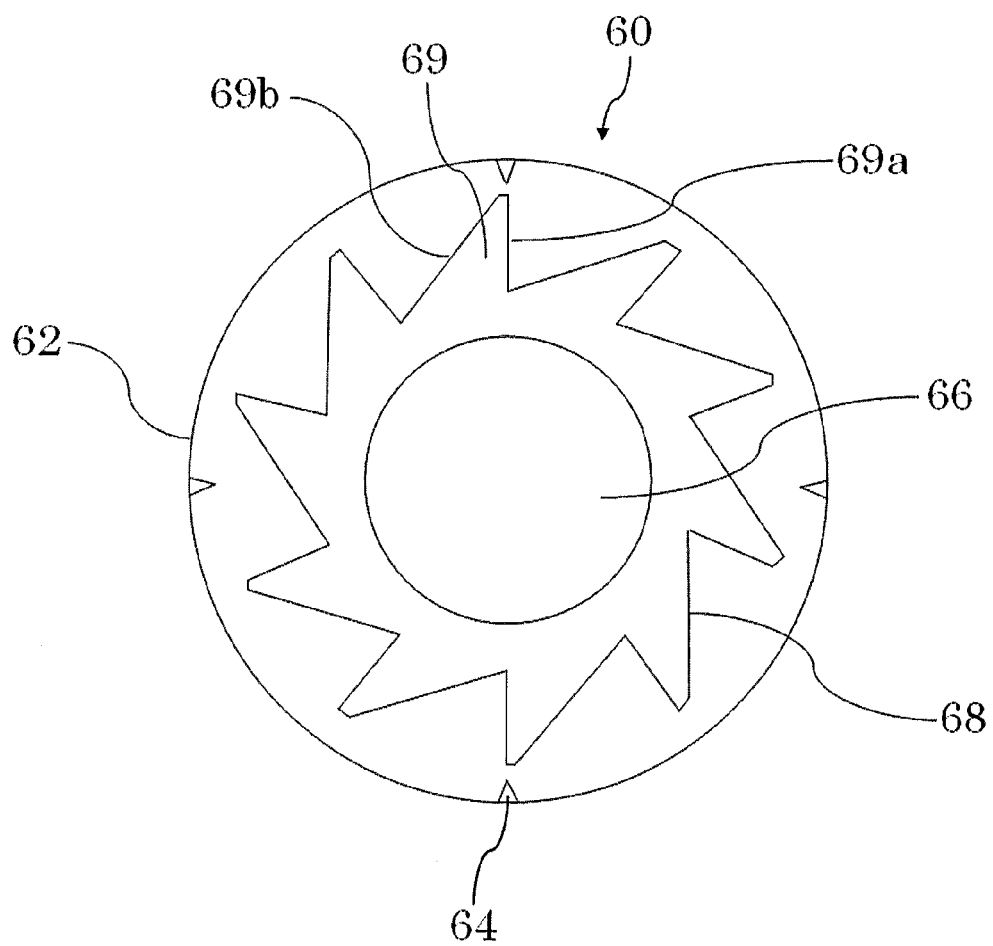
FIG. 6 is a cross-sectional view taken along line VI-VI in FIG. 5.

The structure of the separation unit 60 will be described with reference to FIGS. 5 and 6. FIG. 5 is a side view showing the separation unit 60. FIG. 6 is a cross-sectional view taken along line VI-VI in FIG. 5. The separation unit 60 has a drum 62 (second tubular portion). The drum 62 has a substantially cylindrical tubular shape and is provided so as to be rotatable about its central axis. The central axis of the drum 62 extends horizontally. The inner diameter of the drum 62 may be between 30 cm and 50 cm inclusive, for example.

A large number of holes 62*a* (second holes) are formed in the drum 62. The holes 62*a* are formed over substantially the entire drum 62. The holes 62*a* do not allow paper pieces contained in the gypsum board shredded by the shredding unit 50 to pass through, but allow the gypsum to pass through. The area of each of the holes 62*a* in a plan view is smaller than the area of each of the holes 42*a* in a plan view. The diameter of the holes 62*a* may be between 3 mm and 10 mm inclusive, for example. The separation unit 60 rotates the drum 62 in a state in which the gypsum board shredded by the shredding unit 50 is accommodated therein, thereby separating the gypsum passing through the holes 62*a* from the gypsum board.

A ridge 64 (second ridge) is formed on an inner circumferential surface of the drum 62. The ridge 64 extends in a direction in which the central axis of the drum 62 extends. The ridge 64 extends over substantially the entire path from an inlet side (left side of FIG. 5) to an outlet side (right side of FIG. 5) of the drum 62. Also, the ridge 64 has a substantially triangular cross-sectional shape. The height (length in the radial direction of the drum 62) of the ridge 64 may be between 5 mm and 2 cm inclusive, for example. Preferably, "q" (q: an integer between 3 and 5 inclusive) ridges 64 are provided. The "q" ridges 64 are arranged on the inner circumferential surface of the drum 62 at regular intervals. That is to say, in a cross section (cross section shown in FIG. 6) that is perpendicular to the central axis of the drum 62, an angle β that is formed by a line connecting one ridge 64 to the central axis and a line connecting the next ridge 64 to the central axis is substantially equal to 360°/q. In the present embodiment, q=4 and β=90°.

A rotating rod 66 and a screw member 68 are provided inside the drum 62. The rotating rod 66 has a substantially cylindrical shape and is provided so as to be rotatable about its central axis. The central axis of the rotating rod 66 coincides with the central axis of the drum 62. However, the rotating rod 66 rotates independently of the drum 62. The outer diameter of the rotating rod 66 may be between 15 cm and 25 cm inclusive, for example.

The screw member 68 is helically provided around the rotating rod 66. The screw member 68 is fixed to the rotating rod 66 and rotates together with the rotating rod 66. A plurality of teeth 69 are formed in the screw member 68. An end portion of each tooth 69 is constituted by a side 69*a* and a side 69*b* in a front view (see FIG. 6).

The side 69*a* extends in the radial direction of the drum 62 and the rotating rod 66. An inner end (end that is closer to the rotating rod 66) of the side 69*a* is located at a position spaced apart from the rotating rod 66. Similarly, an outer end (end that is closer to the drum 62) of the side 69*a* is located at a position spaced apart from the drum 62. The distance from the outer end of the side 69*a* to the inner circumferential surface of the drum 62 is larger than the height of the ridge 64 and may be between 1 cm and 3 cm inclusive, for example. The side 69*b* connects the outer end of the side 69*a* to the inner end of the side 69*a* of the next tooth 69. The side 69*b* is longer than the side 69*a*. The ratio of the length of the side 69*b* to the length of the side 69*a* may be between 2 and 2.5 inclusive, for example.

The rotating rod 66 and the screw member 68 rotate in a left-handed direction (counterclockwise) in FIG. 6. That is to say, in each tooth 69, the side 69*b* is located on the forward side with respect to the rotation direction, and the side 69*a* is located on the rearward side with respect to the rotation direction. The rotation direction of the drum 62 described above may be the same as the rotation direction of the rotating rod 66 and the screw member 68 or may be opposite to this rotation direction. In the case where these rotation directions are the same, it is preferable that the rotation speed of the rotating rod 66 and the screw member 68 is greater than the rotation speed of the drum 62.

The separation device 90 is further provided with a transfer path 76, a transfer path 78, and a transfer path 80 (see FIG. 2). The transfer path 76 is a duct (first air pipe) and transfers the gypsum board after shredding by the shredding unit 30 to the separation unit 40 with air pressure. The transfer path 78 is a duct (second air pipe) and transfers the gypsum board after separation by the separation unit 40 to the shredding unit 50 with air pressure. The transfer path 80 is a duct (third air pipe) and transfers the gypsum board after shredding by the shredding unit 50 to the separation unit 60.

Figure 7:
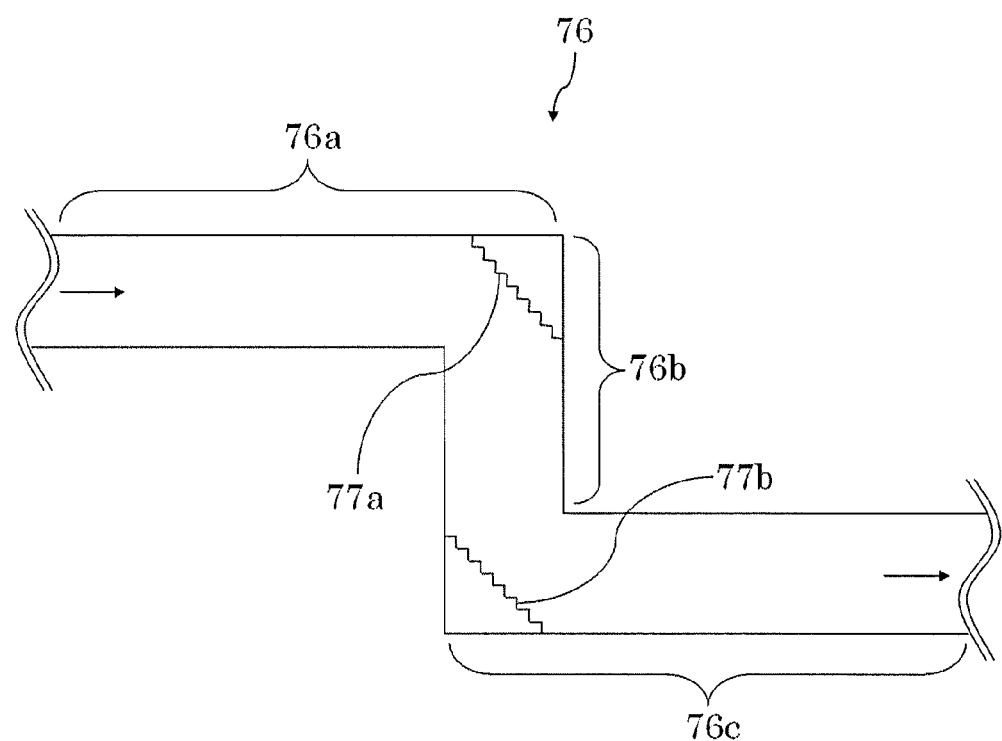
FIG. 7 is a cross-sectional view showing a transfer path 76 of the separation device in FIG. 2.

The structure of the transfer path 76 will be described with reference to FIG. 7. FIG. 7 is a cross-sectional view showing the transfer path 76. The transfer path 76 has a portion 76*a* (first portion) extending in a first direction, a portion 76*b* (second portion) extending in a second direction, and a portion 76*c* (third portion) extending in a third direction. In the present embodiment, the first direction is a horizontal direction, the second direction is a vertical direction, and the third direction is a horizontal direction. The portion 76*b* is connected to the portion 76*a* on a downstream side of the portion 76*a*. The portion 76*c* is connected to the portion 76*b* on the downstream side of the portion 76*b*. Thus, the portion 76*a*, the portion 76*b*, and the portion 76*c* constitute a single cranked duct. The inner diameter of the transfer path 76 may be between 10 cm and 20 cm inclusive, for example.

An uneven surface 77*a* (first uneven surface) is present in a connecting portion between the portion 76*a* and the portion 76*b*. The uneven surface 77*a* is provided at a position where the gypsum board that is transferred through the portion 76*a* collides with this uneven surface. The uneven surface 77*a* is at an angle of about 45° to a vertical plane. For example, a corrugated or embossed plate-like member can be used as the uneven surface 77*a*. The material for the uneven surface 77*a* may be aluminum, for example.

An uneven surface 77*b* (second uneven surface) is present in a connecting portion between the portion 76*b* and the portion 76*c*. The uneven surface 77*b* is provided at a position where the gypsum board that is transferred through the portion 76*b* collides with this uneven surface. The uneven surface 77*b* is at an angle of about 45° to a horizontal plane. For example, a corrugated or embossed plate-like member can be used as the uneven surface 77*b*. The material for the uneven surface 77*b* may be aluminum, for example.

Figure 8:
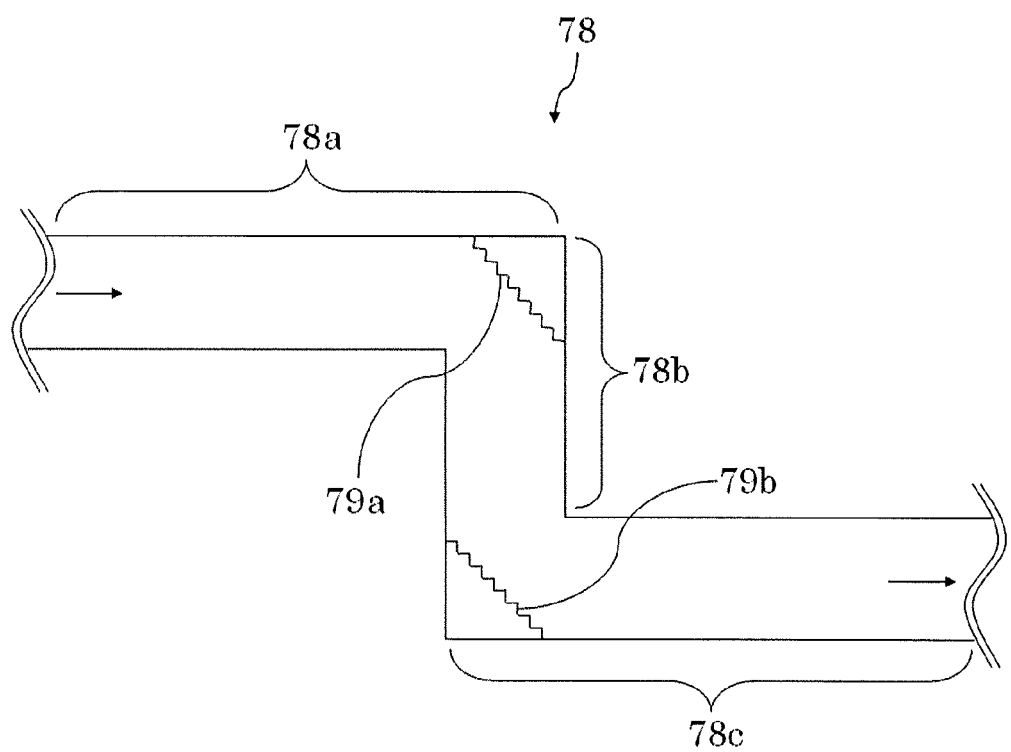
FIG. 8 is a cross-sectional view showing a transfer path 78 of the separation device in FIG. 2.

The structure of the transfer path 78 will be described with reference to FIG. 8. FIG. 8 is a cross-sectional view showing the transfer path 78. The transfer path 78 has a portion 78*a* (first portion) extending in a first direction, a portion 78*b* (second portion) extending in a second direction, and a portion 78*c* (third portion) extending in a third direction. In the present embodiment, the first direction is a horizontal direction, the second direction is a vertical direction, and the third direction is a horizontal direction. The portion 78b is connected to the portion 78a on the downstream side of the portion 78a. The portion 78c is connected to the portion 78b on the downstream side of the portion 78b. Thus, the portion 78a, the portion 78b, and the portion 78c constitute a single cranked duct. The inner diameter of the transfer path 78 may be between 10 cm and 20 cm inclusive, for example.

An uneven surface 79a (third uneven surface) is present in a connecting portion between the portion 78a and the portion 78b. The uneven surface 79a is provided at a position where the gypsum board that is transferred through the portion 78a collides with this uneven surface. The uneven surface 79a is at an angle of about 45° to a vertical plane. For example, a corrugated or embossed plate-like member can be used as the uneven surface 79a. The material for the uneven surface 79a may be aluminum, for example.

An uneven surface 79b (fourth uneven surface) is present in a connecting portion between the portion 78b and the portion 78c. The uneven surface 79b is provided at a position where the gypsum board that is transferred through the portion 78b collides with this uneven surface. The uneven surface 79b is at an angle of about 45° to a horizontal plane. For example, a corrugated or embossed plate-like member can be used as the uneven surface 79b. The material for the uneven surface 79b may be aluminum, for example.

Figure 9:
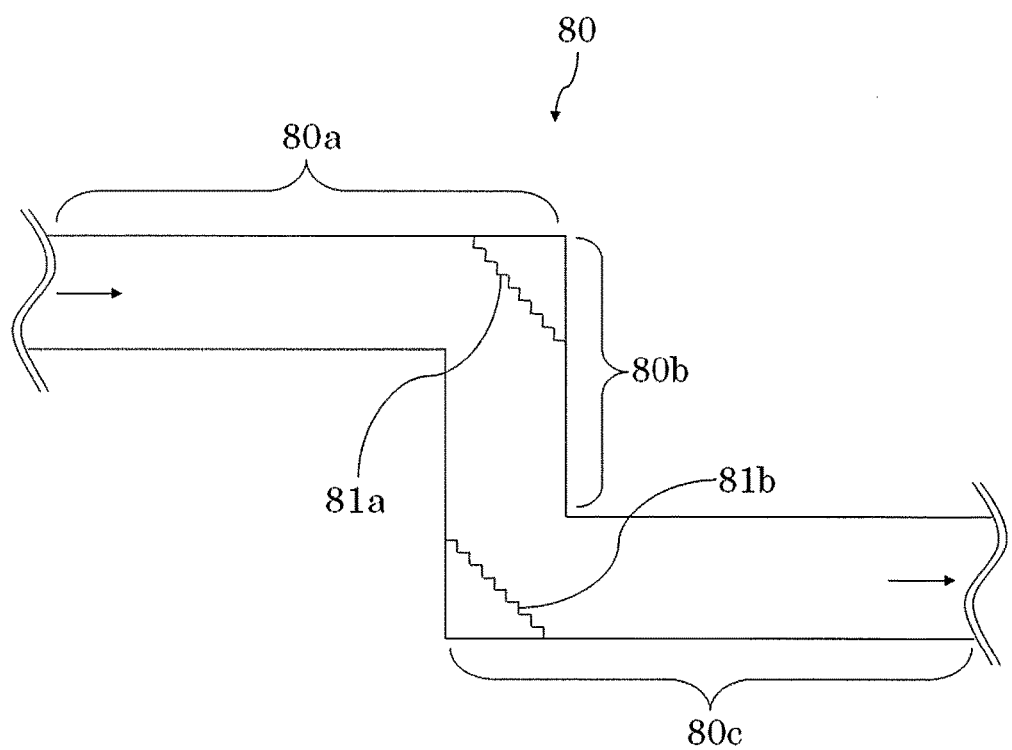
FIG. 9 is a cross-sectional view showing a transfer path 80 of the separation device in FIG. 2.

The structure of the transfer path 80 will be described with reference to FIG. 9. FIG. 9 is a cross-sectional view showing the transfer path 80. The transfer path 80 has a portion 80a (first portion) extending in a first direction, a portion 80b (second portion) extending in a second direction, and a portion 80c (third portion) extending in a third direction. In the present embodiment, the first direction is a horizontal direction, the second direction is a vertical direction, and the third direction is a horizontal direction. The portion 80b is connected to the portion 80a on the downstream side of the portion 80a. The portion 80c is connected to the portion 80b on the downstream side of the portion 80b. Thus, the portion 80a, the portion 80b, and the portion 80c constitute a single cranked duct. The inner diameter of the transfer path 80 may be between 10 cm and 20 cm inclusive, for example.

An uneven surface 81a (fifth uneven surface) is present in a connecting portion between the portion 80a and the portion 80b. The uneven surface 81a is provided at a position where the gypsum board that is transferred through the portion 80a collides with this uneven surface. The uneven surface 81a is at an angle of about 45° to a vertical plane. For example, a corrugated or embossed plate-like member can be used as the uneven surface 81a. The material for the uneven surface 81a may be aluminum, for example.

An uneven surface 81b (sixth uneven surface) is present in a connecting portion between the portion 80b and the portion 80c. The uneven surface 81b is provided at a position where the gypsum board that is transferred through the portion 80b collides with this uneven surface. The uneven surface 81b is at an angle of about 45° to a horizontal plane. For example, a corrugated or embossed plate-like member can be used as the uneven surface 81b. The material for the uneven surface 81b may be aluminum, for example.

The operation of the separation device 90 will be described. A gypsum board, which is a processing target, is first shredded by the shredding unit 30. The gypsum board shredded by the shredding unit 30 is transferred to the separation unit 40 through the transfer path 76. The gypsum board transferred to the separation unit 40 is propelled from the inlet side (left side of FIG. 3) to the outlet side (right side of FIG. 3) of the drum 42 by the rotating screw member 48. Meanwhile, due to the centrifugal force and the like generated by the rotation of the drum 42, the gypsum dissociated from the paper pieces is discharged to the outside of the drum 42 through the holes 42a. Thus, a portion of the gypsum is separated from the gypsum board.

The gypsum board after separation by the separation unit 40 is transferred to the shredding unit 50 through the transfer path 78 and is further shredded. The gypsum board shredded by the shredding unit 50 is transferred to the separation unit 60 through the transfer path 80. The gypsum board transferred to the separation unit 60 is propelled from the inlet side (left side of FIG. 5) to the outlet side (right side of FIG. 5) of the drum 62 by the rotating screw member 68. Meanwhile, due to the centrifugal force and the like generated by the rotation of the drum 62, the gypsum dissociated from the paper pieces is discharged to the outside of the drum 62 through the holes 62a. Thus, the remaining gypsum is separated from the gypsum board.

An example of a manufacturing method of the water absorbing material 1 will be described as an embodiment of a manufacturing method of a water absorbing material according to the present invention. This manufacturing method includes an obtaining step, a granulating step, a coating step, a classification step, and a drying step.

The obtaining step is a step of separating gypsum from a gypsum board to obtain paper powder. The paper powder is obtained in this step so that the weight ratio of the gypsum adhering to the paper powder with respect to the paper powder will be 5% or less.

In the obtaining step, the separation device 90 described above is used. That is, in the obtaining step, a gypsum board is first shredded by the shredding unit 30 (first shredding step). Next, the drum 42 is rotated in a state in which the gypsum board shredded by the shredding unit 30 is accommodated therein, and thereby the gypsum passing through the holes 42a is separated from the gypsum board in the separation unit 40 (first separating step).

After that, the gypsum board from which the gypsum is separated in the first separating step is further shredded by the shredding unit 50 (second shredding step). Next, the drum 62 is rotated in a state in which the gypsum board shredded by the shredding unit 50 is accommodated therein, and thereby the gypsum passing through the holes 62a is separated from the gypsum board in the separation unit 60 (second separating step). Paper pieces obtained in this way are further shredded by a grinder and the like, and thereby paper powder used as a raw material of the granular core portion 10 is obtained.

The obtaining step includes a heating step of heating the gypsum to put the gypsum into a state of hemihydrate gypsum. In the heating step, the gypsum is heated to, for example, approximately 100-200° C. The heating time is, for example, approximately 5-30 minutes.

The heating step may be performed between the first shredding step and the first separating step, and/or between the second shredding step and the second separating step. When the heating step is performed between the first shredding step and the first separating step, a heating unit such as drier is provided between the shredding unit 30 and the separation unit 40 (see FIG. 2). Similarly, when the heating step is performed between the second shredding step and the second separating step, a heating unit such as drier is provided between the shredding unit 50 and the separation unit 60.

Alternatively, the heating step may be performed in the first separating step and/or the second separating step. When the heating step is performed in the first separating step, a heating function is added to the separation unit 40. Similarly, when the heating step is performed in the second separating step, a heating function is added to the separation unit 60. Furthermore, the heating step may be performed before the first shredding step, or before the second shredding step (between the first separating step and the second shredding step). When the heating step is performed before the first shredding step, a heating unit such as drier is provided before the shredding unit 30. Similarly, when the heating step is performed before the second shredding step, a heating unit such as drier is provided before the shredding unit 50 (between the separation unit 40 and the shredding unit 50).

The granulating step is a step of granulating a raw material containing the paper powder obtained in the obtaining step. In this step, a core portion material (material that constitutes the granular core portion 10) containing the paper powder is subjected to extrusion granulation using a granulator after adding water thereto. Thus, the granular core portion 10 is formed. It should be noted that the core portion material may consist only of the paper powder, or may consist of a mixture of the paper powder and other materials.

The coating step is a step of forming the coating layer portion 20 such that the granule (the granular core portion 10) granulated in the granulating step is covered by the coating layer portion 20. In this step, a coating material (material that constitutes the coating layer portion 20) is stuck to the surface of the granular core portion 10 using a coating device and the like. Sticking of the coating material may be performed by, for example, sprinkling or spraying. Thus, the coating layer portion 20 is formed.

The coating material contains fluff pulp and a water-absorbent polymer that are separated from a disposable diaper. The separation device 90 can be used also for such separation. In this case, the processing target corresponds to a disposable diaper, the first material corresponds to plastic, and the second material corresponds to fluff pulp and a water-absorbent polymer. However, it is preferable that no screen is provided in the shredding unit 30. It is also preferable that the diameter of the holes 42*a* is between 10 mm and 30 mm inclusive, the hole diameter of the screen of the shredding unit 50 is between 30 mm and 70 mm inclusive, and the diameter of the holes 62*a* is between 5 mm and 20 mm inclusive.

The coating step may include an adding step of adding the gypsum separated from the gypsum board in the obtaining step to the coating material. The weight ratio of the gypsum added to the coating material with respect to the whole coating material is preferably between 1% and 5% inclusive. A perfume may be added to the coating material.

In the classification step, only the water absorbing materials that meet a predetermined standard are obtained by sifting the water absorbing materials manufactured in the preceding step with a sieve having a predetermined mesh size.

In the drying step, the water absorbing materials obtained in the preceding step are dried by a dryer. By appropriately adjusting the moisture content of the granular core portion 10, it is possible to prevent degradation of water absorbing performance caused by movement of water from the granular core portion 10 to the coating layer portion 20, and to prevent the growth of mold and the like during storage of the water absorbing material 1. Accordingly, the water absorbing material 1 is obtained.

The effects of the present embodiment will be described. In the present embodiment, paper powder obtained by separating gypsum from a gypsum board is employed as a raw material. Thus, the paper powder can be obtained from a waste gypsum board, and therefore it is possible to reduce procuring cost of raw materials and eventually reduce manufacturing cost of the water absorbing material 1. Moreover, because the weight ratio of the gypsum remaining on the paper powder is only 5% or less, it is possible to prevent deterioration in quality of the water absorbing material 1. Accordingly, the water absorbing material 1 which can be manufactured at low cost without causing deterioration in quality, and the manufacturing method thereof are realized.

In contrast, in the case where a large amount of gypsum remains on the paper powder, there is a problem that a raw material containing the paper powder is hardly granulated in manufacture in addition to the problem of degradation of water absorbing performance. There is also a problem that transport cost increases and convenience of a user handling a water absorbing material after manufacture is impaired, because the specific gravity of the water absorbing material becomes larger. According to the present embodiment, the amount of gypsum remaining on the paper powder is sufficiently small, and therefore the above-described problems are solved. Moreover, because even a little gypsum is contained, in the case where a perfume is added to the water absorbing material 1, the perfume hardly evaporates, and thus the retention time of fragrance becomes longer.

In particular, the paper powder is contained in the water absorbing material 1 as the main material in the present embodiment. Thus, the effect of reducing procuring cost of raw materials is remarkably exhibited.

The paper powder is obtained by separating the gypsum from the gypsum board after putting the gypsum into a state of hemihydrate gypsum. In this regard, gypsum that constitutes a gypsum board is in a state of dihydrate gypsum. Because dihydrate gypsum has an acicular crystal structure, the acicular crystal of gypsum pierces into paper in a gypsum board, and thus the gypsum and the paper firmly adhere to each other. In contrast, hemihydrate gypsum does not have the acicular crystal structure, and therefore adhesion between gypsum and paper is relatively weak. Accordingly, there is an advantage that gypsum in a state of hemihydrate gypsum is easier to separate than gypsum in a state of dihydrate gypsum.

The water absorbing material 1 has a multilayer structure consisting of the granular core portion 10 and the coating layer portion 20, and the coating layer portion 20 contains fluff pulp and a water-absorbent polymer that are separated from a disposable diaper as its raw materials. Thus, the raw materials of the coating layer portion 20 can also be obtained from a waste material such as defective disposable diaper, which contributes to reduction of procuring cost of raw materials.

In the case where the coating step includes the adding step of adding the gypsum separated from the gypsum board in the obtaining step to the coating material, the gypsum is effectively reused. Moreover, because the gypsum functions as a curing agent in the coating material, the coating layer portion 20 becomes easier to form.

In the present embodiment, after shredding by the shredding unit 30 and separation by the separation unit 40, shredding by the shredding unit 50 and separation by the separation unit 60 are performed. Therefore, the separation efficiency is improved when compared with the case where shredding and separation are performed only one time. Here, the separation efficiency refers to the ratio of the weight of the second material that is separated from the processing target to the weight of the second material that is contained in the processing target immediately before the processing.

The drum 42 is provided with the ridges 44. If the ridges 44 are not provided, the gypsum board tends to collect in a lower portion of the drum 42 due to the effect of gravity. In contrast, in the present embodiment, the gypsum board in the drum 42 is scooped up by the ridges 44 and thus easily reaches an upper portion of the drum 42. Therefore, the gypsum board is distributed over a wide range of the inner circumferential surface of the drum 42, so that separation by the separation unit 40 is promoted. Moreover, dissociation of the gypsum from the paper pieces is promoted by the impact of the gypsum board when falling down from the upper portion of the drum 42. Furthermore, the ridges 44 become obstacles when the gypsum board is propelled by the screw member 48, and thus the time for which the gypsum board stays in the drum 42 is prolonged. Thus, a larger amount of gypsum can be separated from the gypsum board.

The screw member 48 is provided inside the drum 42. The gypsum board in the drum 42 is beaten and rubbed against the inner circumferential surface of the drum 42 by the screw member 48. The impact and the frictional force at that time promote dissociation of the gypsum from the paper pieces. Moreover, since the ridges 44 are provided, the gypsum board may be beaten and rubbed against the inner circumferential surface of the drum 42 by the screw member 48 in a state in which the gypsum board is caught on the ridges 44. In that case, forces are focused, so that the impact and the frictional force that are applied to the gypsum board increase, and accordingly dissociation of the gypsum from the paper pieces is promoted even more.

The screw member 48 rotates with the side 49b that forms an obtuse angle with the rotation direction (direction of the tangent to the rotating rod 46), rather than the side 49a that forms an approximately right angle with the rotation direction, being located on the forward side (see FIG. 4). Thus, the gypsum board can be prevented from being excessively caught on the teeth 49 of the screw member 48.

The drum 62 is provided with the ridges 64. If the ridges 64 are not provided, the gypsum board tends to collect in a lower portion of the drum 62 due to the effect of gravity. In contrast, in the present embodiment, the gypsum board in the drum 62 is scooped up by the ridges 64 and thus easily reaches an upper portion of the drum 62. Therefore, the gypsum board is distributed over a wide range of the inner circumferential surface of the drum 62, so that separation by the separation unit 60 is promoted. Moreover, dissociation of the gypsum from the paper pieces is promoted by the impact of the gypsum board when falling down from the upper portion of the drum 62. Furthermore, the ridges 64 become obstacles when the gypsum board is propelled by the screw member 68, and thus the time for which the gypsum board stays in the drum 62 is prolonged. Thus, a larger amount of gypsum can be separated from the gypsum board.

The screw member 68 is provided inside the drum 62. The gypsum board in the drum 62 is beaten and rubbed against the inner circumferential surface of the drum 62 by the screw member 68. The impact and the frictional force at that time promote dissociation of the gypsum from the paper pieces. Moreover, since the ridges 64 are provided, the gypsum board may be beaten and rubbed against the inner circumferential surface of the drum 62 by the screw member 68 in a state in which the gypsum board is caught on the ridges 64. In that case, forces are focused, so that the impact and the frictional force that are applied to the gypsum board increase, and accordingly dissociation of the gypsum from the paper pieces is promoted even more.

The screw member 68 rotates with the side 69b that forms an obtuse angle with the rotation direction (direction of the tangent to the rotating rod 66), rather than the side 69a that forms an approximately right angle with the rotation direction, being located on the forward side (see FIG. 6). Thus, the gypsum board can be prevented from being excessively caught on the teeth 69 of the screw member 68.

The transfer path 76 has the portion 76a and the portion 76b that are orthogonal to each other (see FIG. 7). Thus, the gypsum board transferred by air pressure collides with the inner surface of the transfer path 76 in the connecting portion between the portion 76a and the portion 76b. The impact of this collision promotes dissociation of the gypsum from the paper pieces. Furthermore, the transfer path 76 has the portion 76c that is orthogonal to the portion 76b. Thus, the gypsum board transferred by air pressure also collides with the inner surface of the transfer path 76 in the connecting portion between the portion 76b and the portion 76c. The impact of this collision promotes dissociation of the gypsum from the paper pieces.

The uneven surface 77a is present in the connecting portion between the portion 76a and the portion 76b. When colliding with the uneven surface 77a, the gypsum board is subjected to a stronger impact than in the case where it collides with a flat surface. Therefore, dissociation of the gypsum from the paper pieces is promoted even more. Furthermore, the uneven surface 77b is present in the connecting portion between the portion 76b and the portion 76c. When colliding with the uneven surface 77b, the gypsum board is subjected to a stronger impact than in the case where it collides with a flat surface. Therefore, dissociation of the gypsum from the paper pieces is promoted even more.

The transfer path 78 has the portion 78a and the portion 78b that are orthogonal to each other (see FIG. 8). Thus, the gypsum board transferred by air pressure collides with the inner surface of the transfer path 78 in the connecting portion between the portion 78a and the portion 78b. The impact of this collision promotes dissociation of the gypsum from the paper pieces. Furthermore, the transfer path 78 has the portion 78c that is orthogonal to the portion 78b. Thus, the gypsum board transferred by air pressure also collides with the inner surface of the transfer path 78 in the connecting portion between the portion 78b and the portion 78c. The impact of this collision promotes dissociation of the gypsum from the paper pieces.

The uneven surface 79a is present in the connecting portion between the portion 78a and the portion 78b. When colliding with the uneven surface 79a, the gypsum board is subjected to a stronger impact than in the case where it collides with a flat surface. Therefore, dissociation of the gypsum from the paper pieces is promoted even more. Furthermore, the uneven surface 79b is present in the connecting portion between the portion 78b and the portion 78c. When colliding with the uneven surface 79b, the gypsum board is subjected to a stronger impact than in the case where it collides with a flat surface. Therefore, dissociation of the gypsum from the paper pieces is promoted even more.

The transfer path 80 has the portion 80a and the portion 80b that are orthogonal to each other (see FIG. 9). Thus, the gypsum board transferred by air pressure collides with the inner surface of the transfer path 80 in the connecting portion between the portion 80a and the portion 80b. The impact of this collision promotes dissociation of the gypsum from the paper pieces. Furthermore, the transfer path 80 has the portion 80c that is orthogonal to the portion 80b. Thus, the gypsum board transferred by air pressure also collides with the inner surface of the transfer path 80 in the connecting portion between the portion 80b and the portion 80c. The impact of this collision promotes dissociation of the gypsum from the paper pieces.

The uneven surface 81a is present in the connecting portion between the portion 80a and the portion 80b. When colliding with the uneven surface 81a, the gypsum board is subjected to a stronger impact than in the case where it collides with a flat surface. Therefore, dissociation of the gypsum from the paper pieces is promoted even more. Furthermore, the uneven surface 81b is present in the connecting portion between the portion 80b and the portion 80c. When colliding with the uneven surface 81b, the gypsum board is subjected to a stronger impact than in the case where it collides with a flat surface. Therefore, dissociation of the gypsum from the paper pieces is promoted even more.

The water absorbing material and the manufacturing method thereof according to the present invention are not limited to the foregoing embodiments, and various modifications can be made thereto. For example, in the foregoing embodiments, an example in which paper powder derived from a gypsum board is contained in the water absorbing material 1 as the main material has been described. However, the paper powder is not necessarily contained as the main material as long as it is contained in the water absorbing material 1.

In the foregoing embodiments, an example in which gypsum is separated from a gypsum board after being put into a state of hemihydrate gypsum has been described. However, it is also possible that the gypsum is separated from the gypsum board in a state of dihydrate gypsum.

In the foregoing embodiments, an example in which the water absorbing material 1 has a multilayer structure consisting of the granular core portion 10 and the coating layer portion 20 has been described. However, it is also possible that the water absorbing material 1 has a single-layer structure consisting of the granular core portion 10.

In the foregoing embodiments, an example in which shredding and separation are performed two times has been described. However, it is also possible that shredding and separation are performed only one time, or three times or more.

In the foregoing embodiments, an example in which the drum 42 has a cylindrical tubular shape has been described. However, it is also possible that the drum 42 has a tapered shape. The same applies to the drum 62.

In the foregoing embodiments, an example in which the central axis of the drum 42 extends horizontally has been described. However, it is also possible that the central axis of the drum 42 is sloped downward from the inlet side toward the outlet side. The same applies to the drum 62.

In the foregoing embodiments, an example in which the holes 42a are formed over substantially the entire drum 42 has been described. However, it is also possible that the holes 42a are formed in only a portion of the drum 42. Moreover, it is also possible that the holes 42a are formed by forming substantially the whole or a portion of the drum 42 in a mesh form. That is to say, in this case, the meshes of the drum 42 correspond to the holes 42a. The same applies to the holes 62a.

In the foregoing embodiments, an example in which the ridges 44 extend over the entire path from the inlet side to the outlet side of the drum 42 has been described. However, it is also possible that the ridges 44 extend in only a portion of the path from the inlet side to the outlet side of the drum 42. The same applies to the ridges 64.

Figure 10:
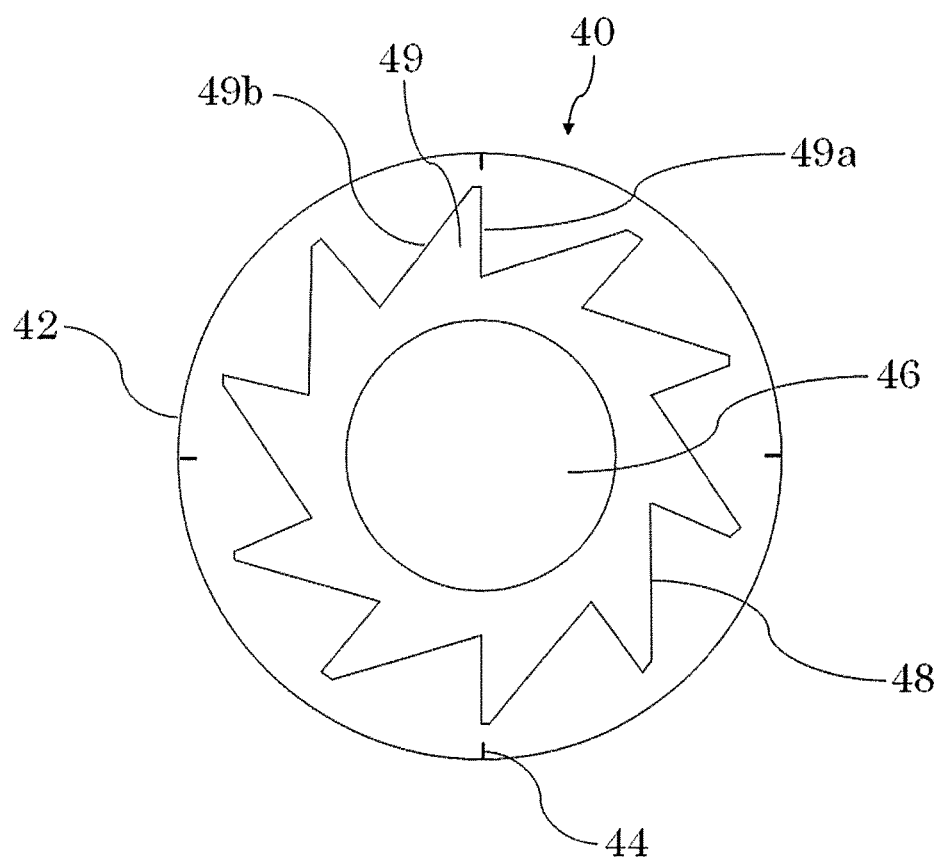
FIG. 10 is a cross-sectional view for explaining a modification of a ridge 44 shown in FIG. 4.

In the foregoing embodiments, the ridges 44 having a substantially triangular cross-sectional shape have been described as an example. However, it is also possible that the ridges 44 have a flat plate-like shape as shown in FIG. 10. The same applies to the ridges 64.

In the foregoing embodiments, an example in which four ridges 44 are provided on the inner circumferential surface of the drum 42 has been described. However, the number of ridges 44 can be set at any number greater than or equal to 1. The same applies to the ridges 64.

In the foregoing embodiments, an example in which the ridges 44 are provided on the inner circumferential surface of the drum 42 has been described. However, the provision of the ridges 44 is not necessarily required. The same applies to the ridges 64.

In the foregoing embodiments, an example in which the rotating rod 46 and the screw member 48 are provided inside the drum 42 has been described. However, the provision of the rotating rod 46 and the screw member 48 is not necessarily required. The same applies to the rotating rod 66 and the screw member 68.

Figure 11:
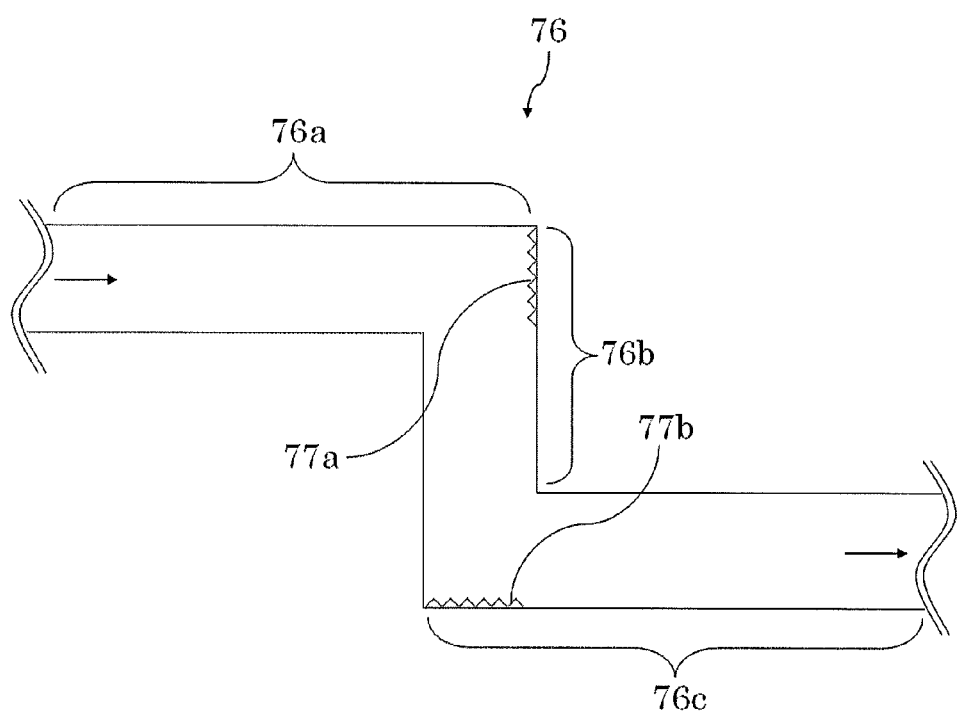
FIG. 11 is a cross-sectional view for explaining a modification of an uneven surface 77a and an uneven surface 77b shown in FIG. 7.
Figure 12:
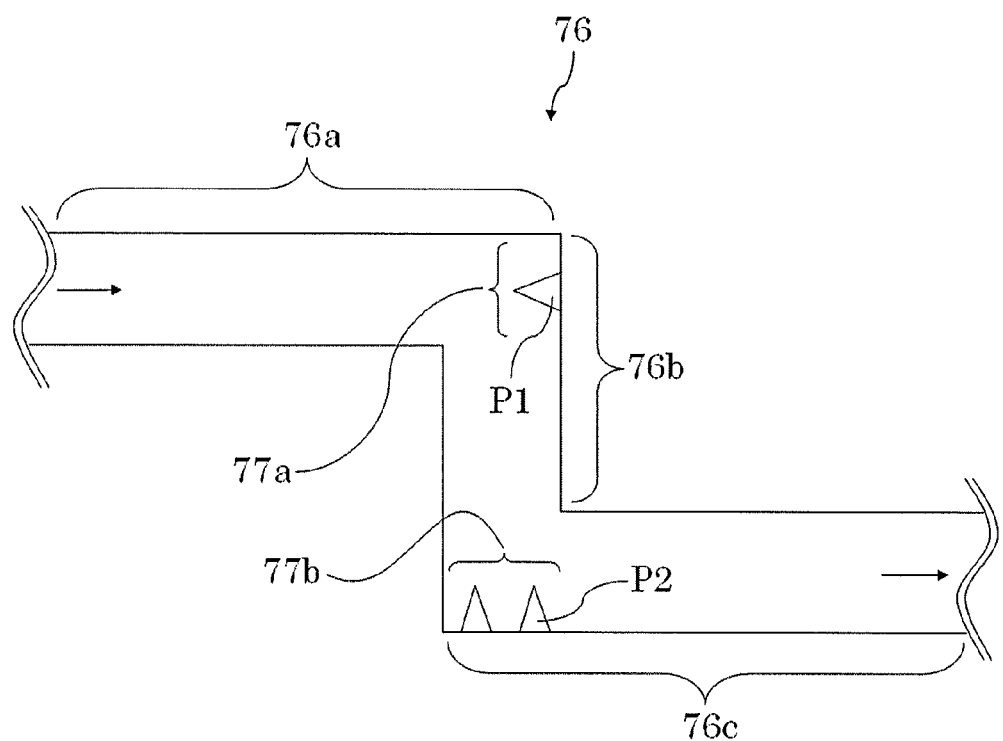
FIG. 12 is a cross-sectional view for explaining a modification of the uneven surface 77a and the uneven surface 77b shown in FIG. 7.

In the foregoing embodiments, an example in which the uneven surface 77a is at a certain angle to a vertical plane has been described. However, it is also possible that the uneven surface 77a extends along a vertical plane as shown in FIG. 11. Moreover, it is also possible that the uneven surface 77a is realized by providing a protrusion P1 on the inner surface (position with which the gypsum board transferred through the portion 76a collides) of the transfer path 76 as shown in FIG. 12. The number of protrusions P1 may be one or may be two or more. The same applies to the uneven surface 79a and the uneven surface 81a.

In the foregoing embodiments, an example in which the uneven surface 77b is at a certain angle to a horizontal plane has been described. However, it is also possible that the uneven surface 77b extends along a horizontal plane as shown in FIG. 11. Moreover, it is also possible that the uneven surface 77b is realized by providing a protrusion P2 on the inner surface (position with which the gypsum board transferred through the portion 76b collides) of the transfer path 76 as shown in FIG. 12. The number of protrusions P2 may be one or may be two or more. The same applies to the uneven surface 79b and the uneven surface 81b.

In the foregoing embodiments, an example in which the uneven surface 77a is provided has been described. However, the provision of the uneven surface 77a is not necessarily required. The same applies to the uneven surface 79a and the uneven surface 81a.

In the foregoing embodiments, an example in which the uneven surface 77b is provided has been described. However, the provision of the uneven surface 77b is not necessarily required. The same applies to the uneven surface 79b and the uneven surface 81b.

In the foregoing embodiment, an example in which the transfer path 76 is constituted by a plurality of portions that are orthogonal to each other has been described (see FIG. 7). However, the transfer path 76 may be a straight line-shaped duct. The same applies to the transfer path 78 and the transfer path 80.

In the foregoing embodiment, an example in which the gypsum is separated from the gypsum board with the separation device 90 has been described. However, separation of the gypsum from the gypsum board may be performed by other devices or methods.

LIST OF REFERENCE NUMERALS

1 Water absorbing material
10 Granular core portion

20 Coating layer portion
30 Shredding unit (first shredding unit)
40 Separation unit (first separation unit)
42 Drum (first tubular portion)
42a Hole (first hole)
44 Ridge (first ridge)
46 Rotating rod
48 Screw member
49 Tooth
50 Shredding unit (second shredding unit)
60 Separation unit (second separation unit)
62 Drum (second tubular portion)
62a Hole (second hole)
64 Ridge (second ridge)
66 Rotating rod
68 Screw member
69 Tooth
76 Transfer path (first air pipe)
77a Uneven surface (first uneven surface)
77b Uneven surface (second uneven surface)
78 Transfer path (second air pipe)
79a Uneven surface (third uneven surface)
79b Uneven surface (fourth uneven surface)
80 Transfer path (third air pipe)
81a Uneven surface (fifth uneven surface)
81b Uneven surface (sixth uneven surface)
90 Separation device

The invention claimed is:

1. A manufacturing method of a water absorbing material, the method comprising:
    an obtaining step of separating gypsum from a gypsum board to obtain paper powder; and
    a granulating step of granulating a raw material containing the paper powder obtained in the obtaining step, wherein:
    in the obtaining step, the gypsum is separated from the gypsum board with a separation device so that a weight ratio of the gypsum adhering to the paper powder with respect to the paper powder will be 5% or less,
    the separation device includes:
        a first shredding unit that shreds the gypsum board; and
        a first separation unit (i) that has a first tubular portion in which are formed a plurality of first holes that allow the gypsum to pass through without allowing paper pieces contained in the gypsum board shredded by the first shredding unit to pass through and (ii) that separates the gypsum passing through the first holes from the gypsum board by rotating the first tubular portion in a state in which the gypsum board shredded by the first shredding unit is accommodated in the first tubular portion, and
    an inside of the first tubular portion is provided with (i) a rotating rod that has a central axis coinciding with a central axis of the first tubular portion and is rotatable about the central axis and (ii) a screw member that is helically provided around the rotating rod and has a plurality of teeth formed in the screw member.

2. The manufacturing method of the water absorbing material according to claim 1,
    wherein the obtaining step includes a heating step of heating the gypsum to put the gypsum into a state of hemihydrate gypsum.

3. The manufacturing method of the water absorbing material according to claim 1, comprising a coating step of coating a granule granulated in the granulating step with a coating material.

4. The manufacturing method of the water absorbing material according to claim 3,
    wherein the coating material contains fluff pulp and a water-absorbent polymer that are separated from a disposable diaper.

5. The manufacturing method of the water absorbing material according to claim 3,
    wherein the coating step includes an adding step of adding the gypsum separated from the gypsum board in the obtaining step to the coating material.

6. The manufacturing method of the water absorbing material according to claim 1,
    wherein the separation device includes a first ridge that is provided on an inner circumferential surface of the first tubular portion and that extends in a direction in which the central axis of the first tubular portion extends.

7. The manufacturing method of the water absorbing material according to claim 6,
    wherein "p" of said first ridges are present, "p" being an integer between 3 and 5 inclusive, and the "p" first ridges are arranged on the inner circumferential surface of the first tubular portion at regular intervals.

8. The manufacturing method of the water absorbing material according to claim 1,
    wherein the separation device includes a first air pipe for transferring the gypsum board shredded by the first shredding unit to the first separation unit with air pressure, and
    the first air pipe has a first portion that extends in a first direction and a second portion that is connected to the first portion on a downstream side of the first portion and that extends in a second direction substantially orthogonal to the first direction.

9. The manufacturing method of the water absorbing material according to claim 8,
    wherein the separation device includes a first uneven surface that is present in a connecting portion between the first portion and the second portion of the first air pipe and with which the gypsum board transferred through the first portion collides.

10. The manufacturing method of the water absorbing material according to claim 8,
    wherein the first air pipe has a third portion that is connected to the second portion on a downstream side of the second portion and that extends in a third direction substantially orthogonal to the second direction.

11. The manufacturing method of the water absorbing material according to claim 10,
    wherein the separation device includes a second uneven surface that is present in a connecting portion between the second portion and the third portion of the first air pipe and with which the gypsum board transferred through the second portion collides.

12. The manufacturing method of the water absorbing material according to claim 1,
    wherein the separation device further includes:
        a second shredding unit that shreds the gypsum board from which the gypsum passing through the first holes is separated by the first separation unit; and
        a second separation unit (i) that has a second tubular portion in which are formed a plurality of second holes that allow the gypsum to pass through without allowing the paper pieces contained in the gypsum board shredded by the second shredding unit to pass through and (ii) that separates the gypsum passing through the second holes from the gypsum board by rotating the second tubular portion in a state in which the gypsum board shredded by the second shredding unit is accommodated in the second tubular portion.

13. The manufacturing method of the water absorbing material according to claim 12,
wherein an area of each of the second holes in a plan view is smaller than an area of each of the first holes in a plan view.

\* \* \* \* \*